US008010153B2

(12) United States Patent
Rofougaran (10) Patent No.: US 8,010,153 B2
(45) Date of Patent: *Aug. 30, 2011

(54) RFIC WITH CELLULAR AND RFID FUNCTIONALITY

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/895,806

(22) Filed: Sep. 30, 2010

(65) Prior Publication Data

US 2011/0021246 A1 Jan. 27, 2011

Related U.S. Application Data

(63) Continuation of application No. 11/729,393, filed on Mar. 28, 2007, now Pat. No. 7,826,865, which is a continuation-in-part of application No. 11/641,999, filed on Dec. 19, 2006.

(51) Int. Cl.
*H04M 1/00* (2006.01)

(52) U.S. Cl. .................. 455/552.1; 455/553.1; 455/41.2; 455/11.1; 455/102; 455/103; 455/108

(58) Field of Classification Search ........ 455/41.1–41.2, 455/552.1, 553.1, 78–87, 102, 103, 108, 455/110, 127.1, 127.2, 127.4, 232.1, 234.1, 455/88, 11.1
See application file for complete search history.

(56) References Cited

U.S. PATENT DOCUMENTS

| 7,356,343 | B2 * | 4/2008 | Feher | 455/456.1 |
| 7,466,975 | B2 * | 12/2008 | Feher | 455/404.2 |
| 7,558,574 | B2 * | 7/2009 | Feher | 455/440 |
| 2007/0213022 | A1 * | 9/2007 | Darabi | 455/232.1 |

* cited by examiner

*Primary Examiner* — Tuan A Tran
(74) *Attorney, Agent, or Firm* — Garlick Harrison & Markison (57) ABSTRACT

An integrated circuit (IC) includes a baseband processing module and a radio frequency (RF) section. The baseband processing module is coupled to convert outbound data into amplitude modulation information and phase modulation information when the IC is in a cellular data mode and to convert an outbound radio frequency identification (RFID) signal into RFID amplitude modulation information when the IC is in an RFID mode. The RF section is coupled to generate an outbound RF data signal in accordance with the amplitude modulation information and the phase modulation information when the IC is in the cellular data mode and to generate an outbound RF RFID signal in accordance with the RFID amplitude information when the IC is in the RFID mode.

17 Claims, 11 Drawing Sheets

RFIC WITH CELLULAR AND RFID FUNCTIONALITY

CROSS REFERENCE TO RELATED APPLICATIONS

This application is a continuation of and claims priority to U.S. Patent Application having an application Ser. No. 11/729,393, filed Mar. 28, 2007, which application is incorporated herein by reference in its entirety for all purposes.

The Ser. No. 11/729,393 application is a continuation-in-part of and claims priority to U.S. Patent Application having an application Ser. No. 11/641,999, filed Dec. 19, 2006.

BACKGROUND OF THE INVENTION

1. Technical Field of the Invention

This invention relates generally to wireless communication systems and more particularly to integrated circuits of transceivers operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As the desire for wireless communication devices to support multiple standards continues, recent trends include the desire to integrate more functions on to a single chip. However, such desires have gone unrealized when it comes to implementing baseband and RF on the same chip for multiple wireless communication standards.

Therefore, a need exists for an integrated circuit (IC) that implements baseband and RF of multiple wireless communication standards on the same IC die.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
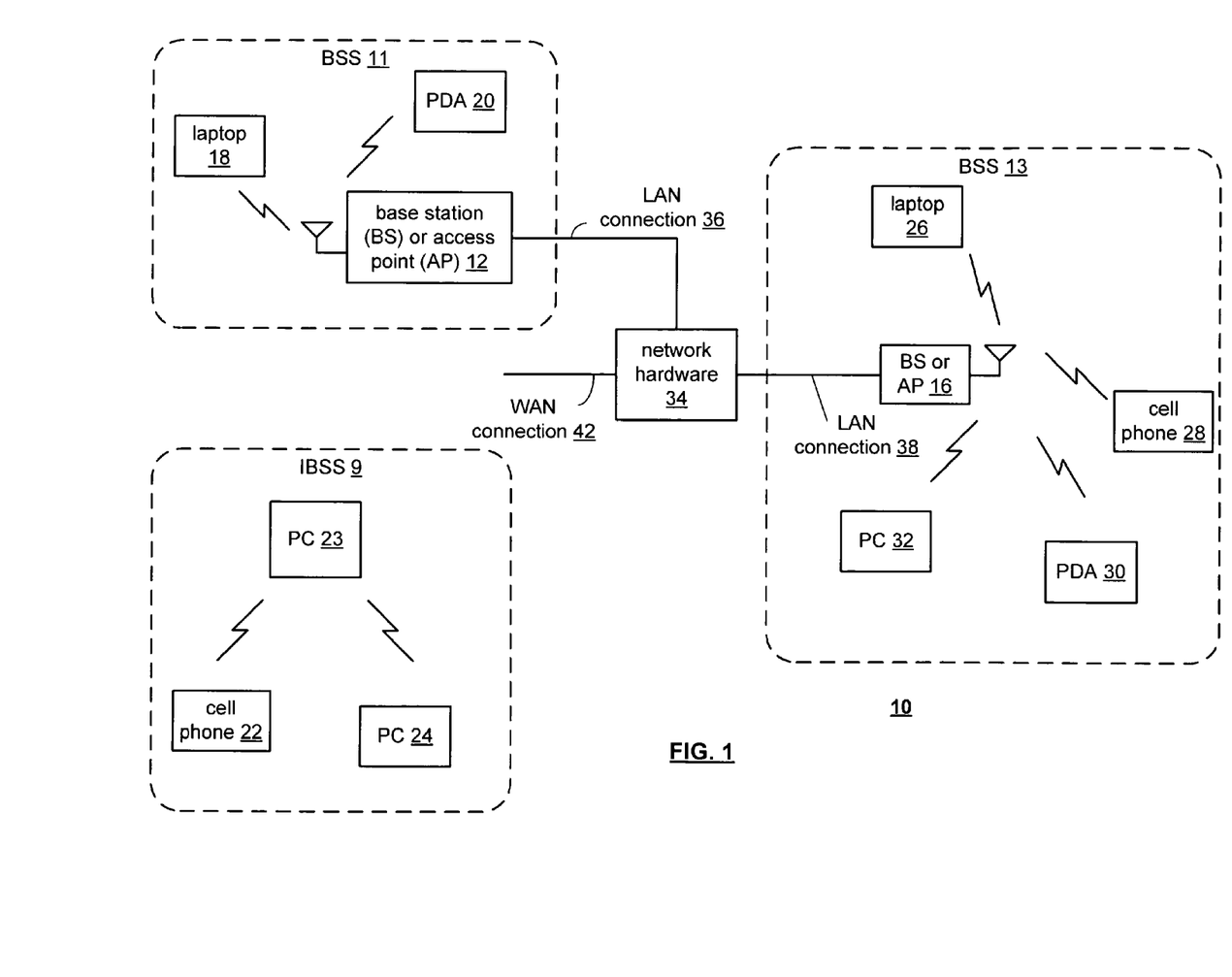
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-13.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
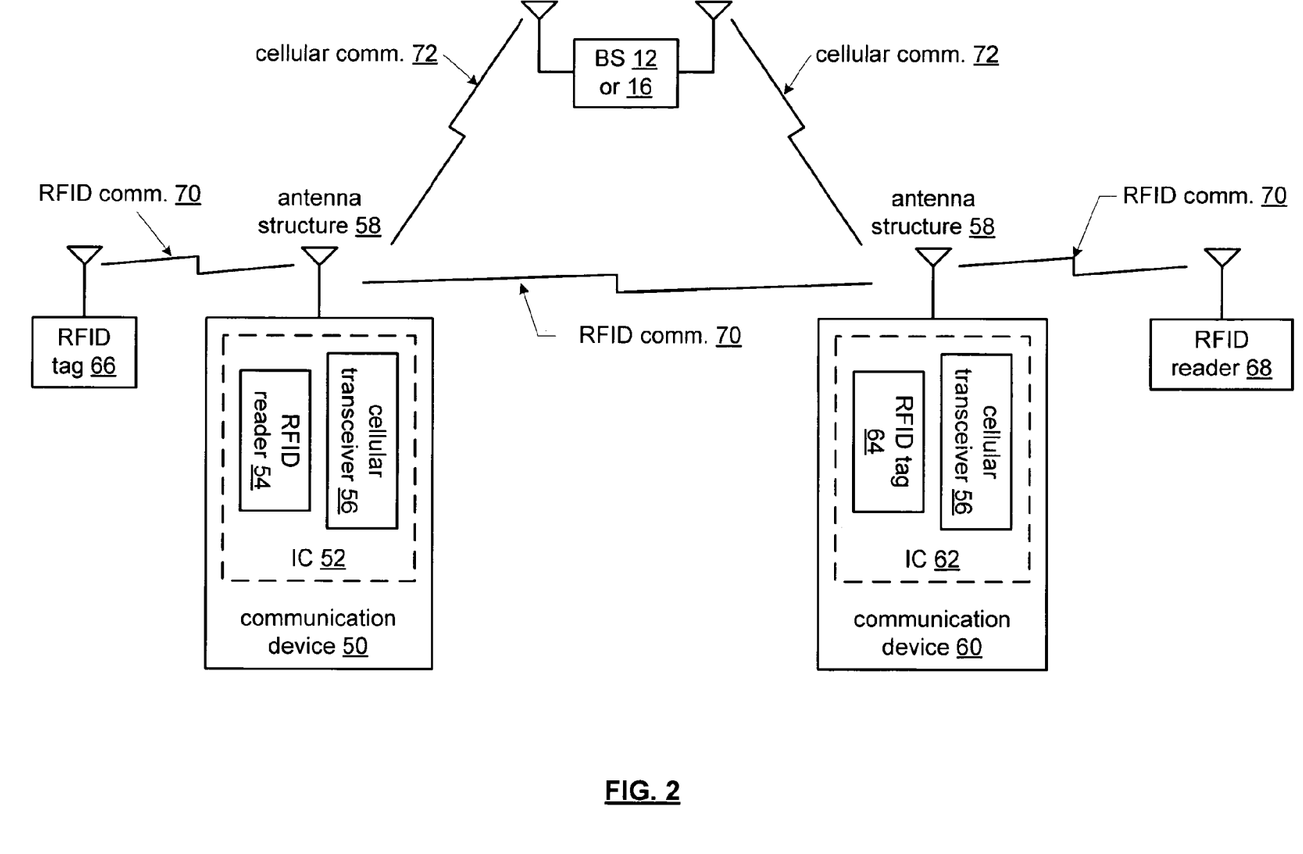
FIG. 2 is a schematic block diagram of another embodiment of a wireless communication system in accordance with the present invention.

FIG. 2 is a schematic block diagram of another embodiment of a wireless communication system that includes two communication devices 50 and 60. The communication devices 50 and 60 may each be one of the communication devices 18-32 of FIG. 1 or another type of communication device. Communication device 50 includes an integrated circuit (IC) 52 and an antenna structure 58 and communication device 60 includes an IC 62 and an antenna structure 58. IC 52 includes a radio frequency identification (RFID) reader section 54 and a cellular transceiver section 56 and IC 62 includes an RFID tag section 64 and a cellular transceiver section 56. The antenna structure 58 may include one or more antennas that may be configured to provide a diversity antenna system, an in-air beamforming antenna system, a polarization antenna system, a single input single output (SISO) antenna structure, a multiple input multiple output (MIMO) antenna structure and/or a combination thereof.

In this embodiment, communication device 50 may participate in an RFID communication 70 with communication device 60, may participate in an RFID communication with an RFID tag 66, and/or in a cellular communication 72 with a base station 12 or 16. The RFID communication 70 may include a request for data from the RFID tag 64 or 66, a download of data to the RFID tag 64 or 66, a command for RFID tag 64 or 66, a response to a request or command from the RFID tag 64 or 66, and/or an acknowledgement from the RFID tag 64 or 66. The cellular communication 72 may be in accordance with one of a plurality of voice cellular communication standards (e.g., GSM, CDMA, WCDMA, digital AMPS, etc.) and/or with one of a plurality of cellular data communication standards (e.g., EDGE, GPRS, HSDPA, HSUPA, etc.).

In an embodiment, the communication device 50 may receive a cellular communication 72 to place an RFID communication 70 with RFID tag 64 or 66. In this instance, the communication device 50 would initiate an RFID communication 70 with the RFID tag 64 or 66 and would communicate the received response via the cellular communication 72.

In another embodiment, the communication device 60 receive a cellular communication 72 that includes a request for data from the RFID tag 64, a download of data to the RFID tag 64, and/or a command for RFID tag 64. The RFID tag 64 would process the request, download, and/or command and provide the appropriate response to the cellular transceiver 56 for transmission as a cellular communication 72.

In another embodiment, the communication device 60 may receive an RFID communication 70 from RFID reader 68. In this instance, the communication device 60 may be in a power down state, where the RFID tag 64 generates the power it needs to process the RFID communication 70 and to provide the appropriate response.

In yet another embodiment, the cellular communication 72 may be a data over IP communication via an access point (AP) of a WLAN. In this instance, the cellular communication 72 may be in accordance with IEEE 802.11 and/or any version or extensions thereof.

Figure 3:
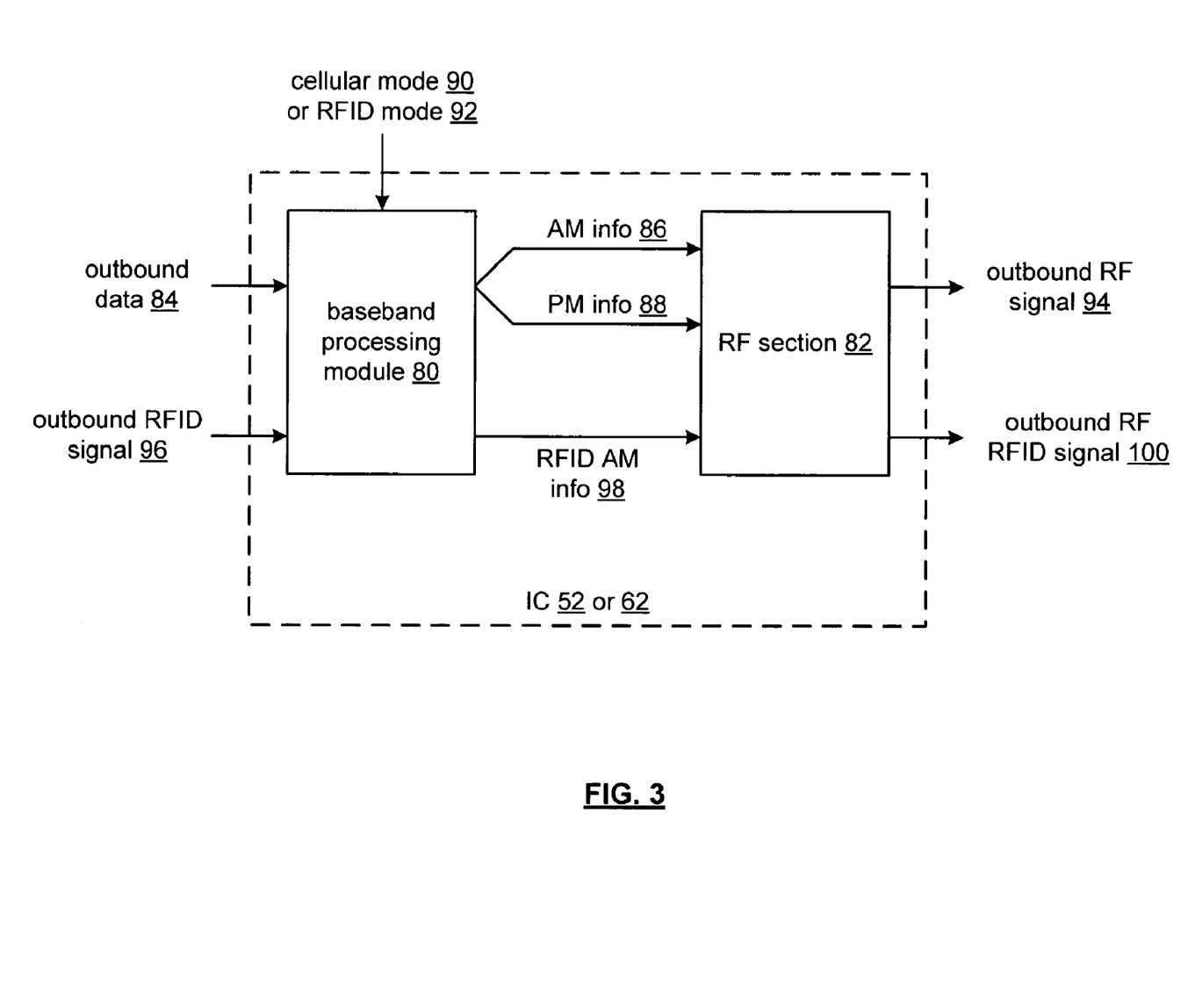
FIG. 3 is a schematic block diagram of an embodiment of an integrated circuit in accordance with the present invention.

FIG. 3 is a schematic block diagram of an embodiment of an integrated circuit 52 and/or 62 that includes a baseband processing module 80 and a radio frequency (RF) section 82. The baseband processing module 80 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 3-11.

The baseband processing module 80 converts outbound data 84 (e.g., a voice signal, data, a text file, an audio file, a video file, an image file, and/or a combination thereof) into amplitude modulation information 86 [e.g., A(t) of a baseband symbol stream of A(t)cos($\omega_0$(t)+$\phi$(t))] and phase modulation information 88 [e.g., $\phi$(t) of the baseband symbol stream of A(t)cos($\omega_0$(t)+$\phi$(t))] when the IC 52 and/or 62 is in a cellular data mode 90 (e.g., IEEE 802.11a, b, g, n, etc., Bluetooth, EDGE, HSDPA, HSUPA, etc.). The RF section 82, which will be described in greater detail with reference to FIGS. 4-11, generates an outbound RF data signal 94 [e.g., A(t)cos($\omega_{RF}$(t)+$\phi$(t))] in accordance with the amplitude modulation information 86 and the phase modulation information 88.

When the IC 52 and/or 62 is in an RFID mode 92, the baseband processing module 80 converts an outbound RFID signal 96 into RFID amplitude modulation information 98 [e.g., A(t) of a backscattered symbol stream of A(t)cos($\omega_0$(t))]. Note that the outbound RFID signal 96 may be a request, a command, and/or a download from an RFID reader 54 or a response from an RFID tag 64. The RF section 82 generates an outbound RF RFID signal 100 in accordance with the RFID amplitude information 98.

Figure 4:
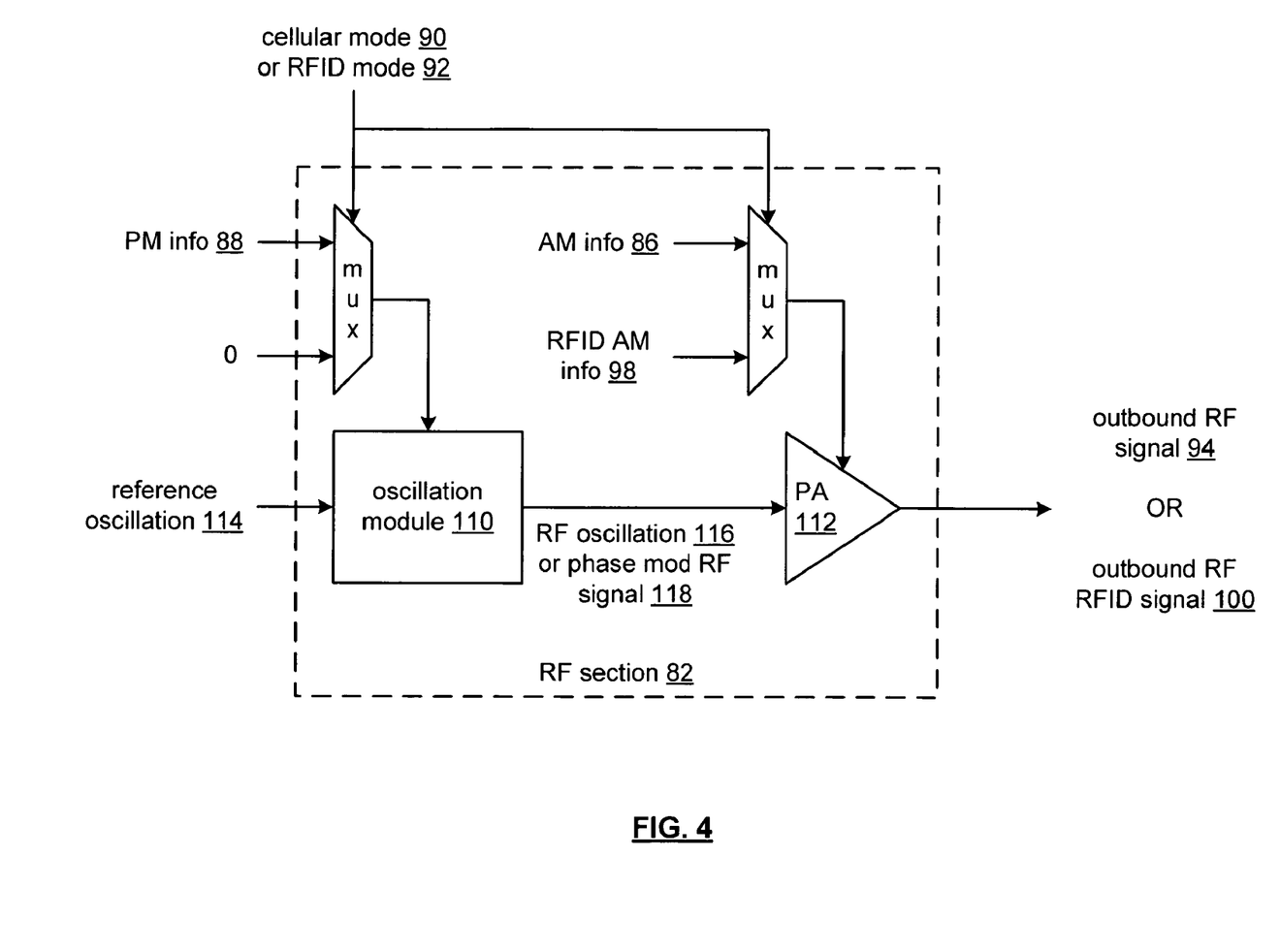
FIG. 4 is a schematic block diagram of an embodiment of an RF section in accordance with the present invention.

FIG. 4 is a schematic block diagram of an embodiment of the RF section 82 that includes an oscillation module 110 and a power amplifier module 112. The oscillation module 110, which may be a phase locked loop, a fractional-N synthesizer, a clock circuit, a frequency divider, and/or a frequency multiplier, converts a reference oscillation 114 into an RF oscillation 116. When the IC 52 and/or 63 is in the cellular data mode 90, the oscillation module 110 modulates the RF oscillation 116 based on the phase modulation information 88 to produce a phase modulated RF signal 118. When the IC 52 and/or 62 is in the RFID mode 92, the oscillation module 110 does not modulate the RF oscillation 116.

The power amplifier module 112, which includes one or more power amplifier drivers and one or more power amplifiers coupled in series and/or in parallel, amplifies the RF oscillation 116 [e.g., cos($\omega_{RF}$(t))] in accordance with the RFID amplitude modulation information 98 [e.g., A(t)] to produce the outbound RF RFID signal 100 [e.g., A(t)cos($\omega_{RF}$(t))] when the IC is in the RFID mode 92. The power amplifier module 112 amplifies the phase modulated RF signal 118 [e.g., cos($\omega_{RF}$(t)+$\phi$(t))] in accordance with the amplitude modulation information 86 [e.g., A(t)] to produce the outbound RF data signal 94 [e.g., A(t)cos($\omega_{RF}$(t)+$\phi$(t))] when the IC is in the cellular data mode 90.

Figure 5:
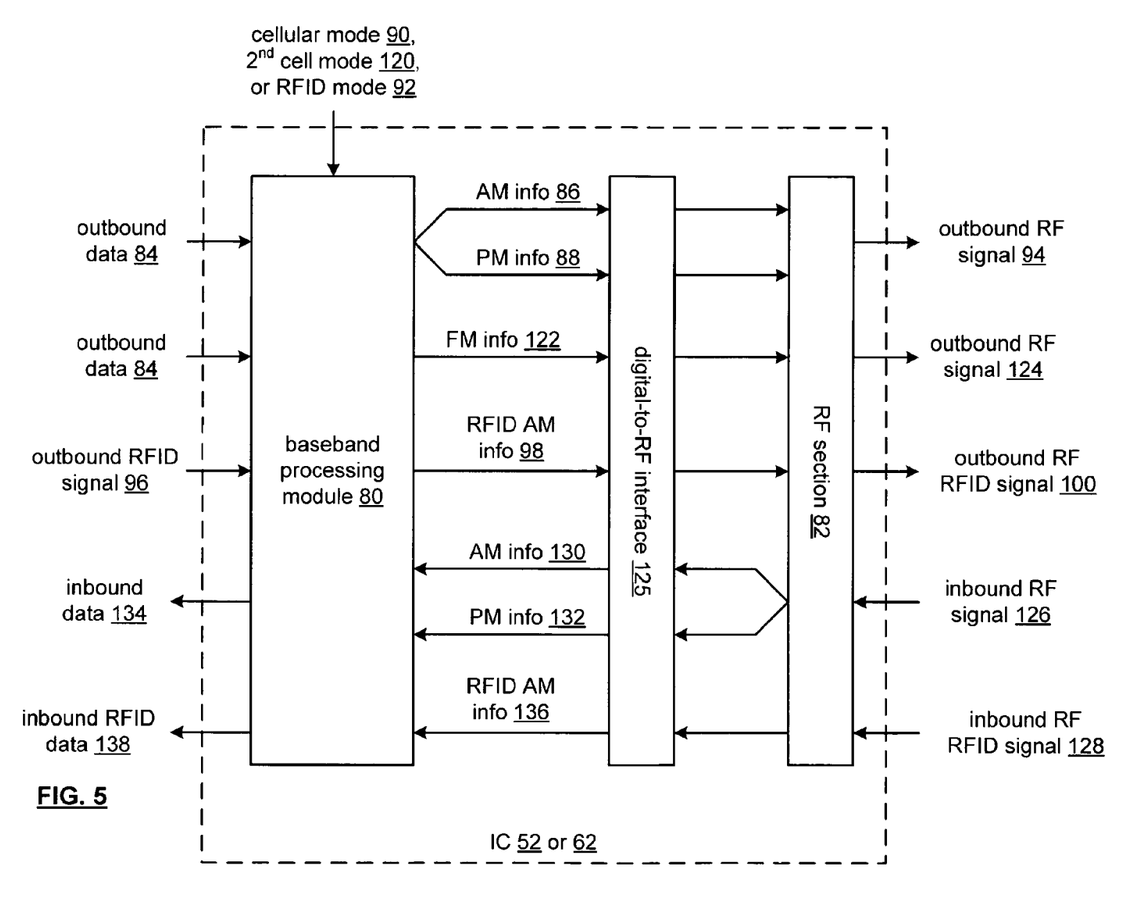
FIG. 5 is a schematic block diagram of another embodiment of an integrated circuit in accordance with the present invention.

FIG. 5 is a schematic block diagram of another embodiment of an integrated circuit 52 and/or 62 that includes baseband processing module 80, the RF section 82, and a digital-to-RF interface 125. The digital-to-RF interface 125 may be implemented as described in co-pending patent application entitled VOICE/DATA/RF INTEGRATED CIRCUIT, having a filing date of Dec. 19, 2006, and a Ser. No. 11/641,999.

In addition to converting the outbound data 84 into amplitude and phase modulation information 86 and 88, the baseband processing module 80 may convert the outbound data 84 into frequency modulation information 122 when the IC 52 and/or 62 is in a second cellular data mode 120. For example, the IC 52 and/or 62 may be in a GPRS cellular data mode that uses a Gaussian minimum shift keying (GMSK) baseband data modulation scheme, which is a form of frequency shift keying (FSK). As such, for this example, the baseband processing module 80 generates a GMSK symbol stream as the frequency modulation information 122.

The RF section 82 generates the outbound RF data signal 124 in accordance with the frequency modulation information 124 when the IC is in the second cellular data mode. Continuing with the above example, the RF section 82 converts the GMSK symbol stream into the outbound RF data signal 124 by modulating an RF oscillation with the GMSK symbol stream.

In another embodiment, the RF section 82 generates inbound amplitude modulation information 130 and inbound phase modulation information 132 from an inbound RF data signal 126 when the IC is in the cellular data mode 90. The baseband processing module 80 converts the inbound amplitude modulation information 130 and the inbound phase modulation information 132 into inbound data 134. For example, the inbound amplitude and phase modulation information 130 and 132 may be in accordance with the EDGE protocol.

When the IC 52 and/or 62 is in the RFID mode 92, the RF section 82 generates inbound RFID amplitude information 136 from an inbound RF RFID signal 128. The baseband processing module 80 converts the inbound RFID amplitude modulation information 136 into an inbound RFID signal 138.

Figure 6:
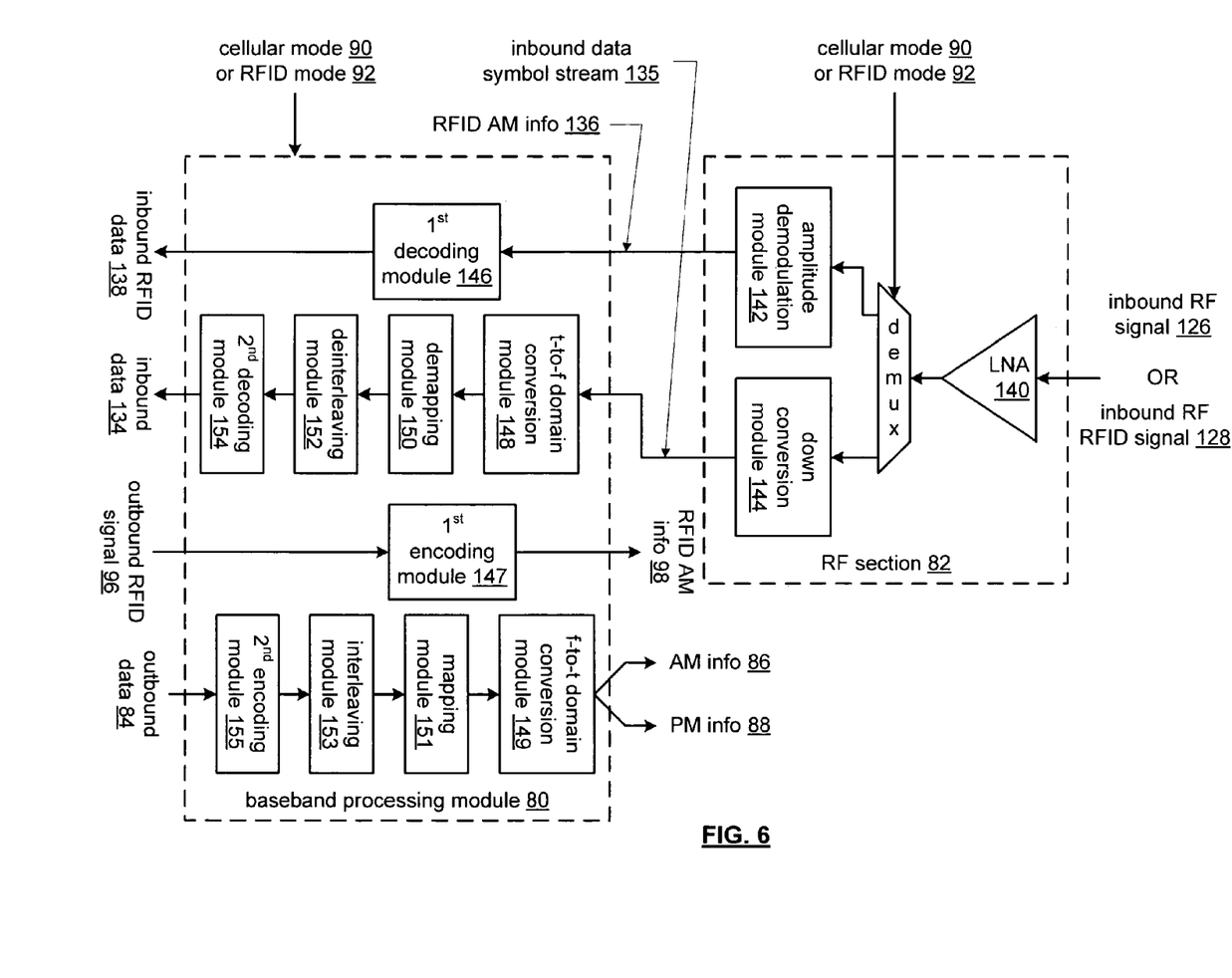
FIG. 6 is a schematic block diagram of another embodiment of an integrated circuit in accordance with the present invention.

FIG. 6 is a schematic block diagram of another embodiment of an integrated circuit 52 and/or 62 that includes the baseband processing module 80 and the RF section 82. The RF section 82 includes a low noise amplifier (LNA) module 140, an amplitude demodulation module 142, and a down conversion module 144. The baseband processing module 80 includes a $1^{st}$ decoding module 146 and a $1^{st}$ encoding module 147 that are used when the IC 52 and/or 62 is in the RFID mode 90. The baseband processing module 80 also includes a time-to-frequency domain conversion module 148, a demapping module 150, a deinterleaving module 152, a $2^{nd}$ decoding module 154, a $2^{nd}$ encoding module 155, an interleaving module 153, a mapping module 151, and a frequency-to-time domain conversion module 149 that are used when the IC 52 and/or 62 is in the cellular mode 90.

When the IC 52 and/or 62 is in the RFID mode 92, the LNA module 140, which includes one or more low noise amplifiers coupled in series and/or in parallel, amplifies the inbound RF RFID signal 128 to produce an amplified inbound RF RFID signal. The amplitude demodulation module 142, which may be an envelope detector, a blocking module, and/or a quadrature down conversion mixing module, demodulates the amplified inbound RF RFID signal to produce the inbound RFID amplitude information 136. The $1^{st}$ decoding module 146, which may include a pre-decoding section and a decoding section, decodes the inbound RFID amplitude modulation information 136, which may be bi-phase encoded, to produce the inbound RFID signal 138.

When the IC 52 and/or 62 is in the cellular data mode 90, the LNA module 140 amplifies the inbound RF data signal 126 to produce an amplified inbound RF data signal. The down conversion module 144, which may include quadrature mixers, a local oscillation module, and filters, converts the amplified inbound RF data signal into an inbound data symbol stream 135 that includes the inbound phase and amplitude modulation information 130 and 132. The time-to-frequency domain conversion module 148 converts the inbound data symbol stream 135 into inbound time domain data symbols. The demapping module 150 demaps the inbound time domain data symbols to produce interleaved inbound data. The deinterleaving module 152 deinterleaves the interleaved inbound data to produce inbound encoded data and the second decoding module 154 decodes the inbound encoded data to produce the inbound data 134.

The baseband processing module 80 utilizes the $1^{st}$ encoding module 147 to amplitude modulate the outbound RFID signal 96 when the IC 52 and/or 62 is in the RFID mode 90. When the IC 52 and/or 62 is in the cellular mode 90, the baseband processing module 80 utilizes the $2^{nd}$ encoding module 155 to encode (e.g., ½ rate convolutional encoding) the outbound data 84 to produce encoded data. The interleaving module 153 interleaves the encoded data to produce interleaved data. The mapping module 151 maps the interleaved data to a constellation map to produce frequency domain symbols. The frequency-to-time domain conversion module 149 converts the frequency domain symbols to a time domain symbol stream that includes the amplitude modulation information 86 and the phase modulation information 88.

Figure 7:
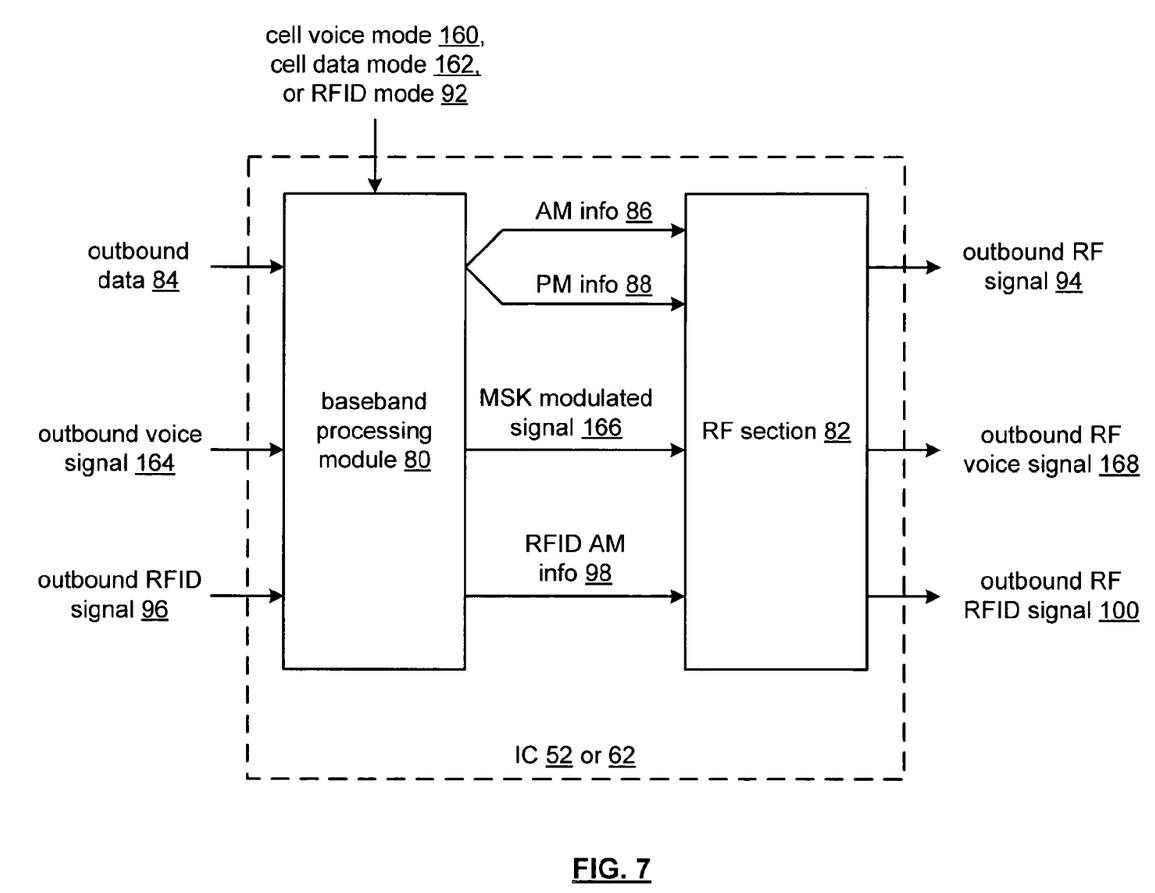
FIG. 7 is a schematic block diagram of another embodiment of an integrated circuit in accordance with the present invention.

FIG. 7 is a schematic block diagram of another embodiment of an integrated circuit 52 and/or 62 that include the baseband processing module 80 and the RF section 82. In an alternative embodiment, the IC 52 and/or 62 may further include an on-chip digital-to-RF interface coupling the baseband processing module 80 to the RF section 82.

In an embodiment, the baseband processing module 80 convert an outbound voice signal 164 into a minimum shift keying (MSK) modulated signal when the IC is in a cellular voice mode 160 (e.g., GSM). When the IC 52 and/or 62 is in a cellular data mode 162 (e.g., EDGE or HSDPA), the baseband processing module 80 converts the outbound data 84 into amplitude modulation information 86 and phase modulation information 88. When the IC 52 and/or 62 is in an RFID mode 92, the baseband processing module 80 converts the outbound RFID signal 96 into RFID amplitude modulation information 98.

The RF section 82 generates an outbound RF voice signal 169 from the MSK modulated signal 166 when the IC is in the cellular voice mode 160. When the IC 52 and/or 62 is in a cellular data mode 162, the RF section 82 generates the outbound RF data signal 94 in accordance with the amplitude modulation information 86 and the phase modulation information 88. When the IC 52 and/or 62 is in an RFID mode 92, the RF section 82 generates the outbound RF RFID signal 100 in accordance with the RFID amplitude information 98.

Figure 8:
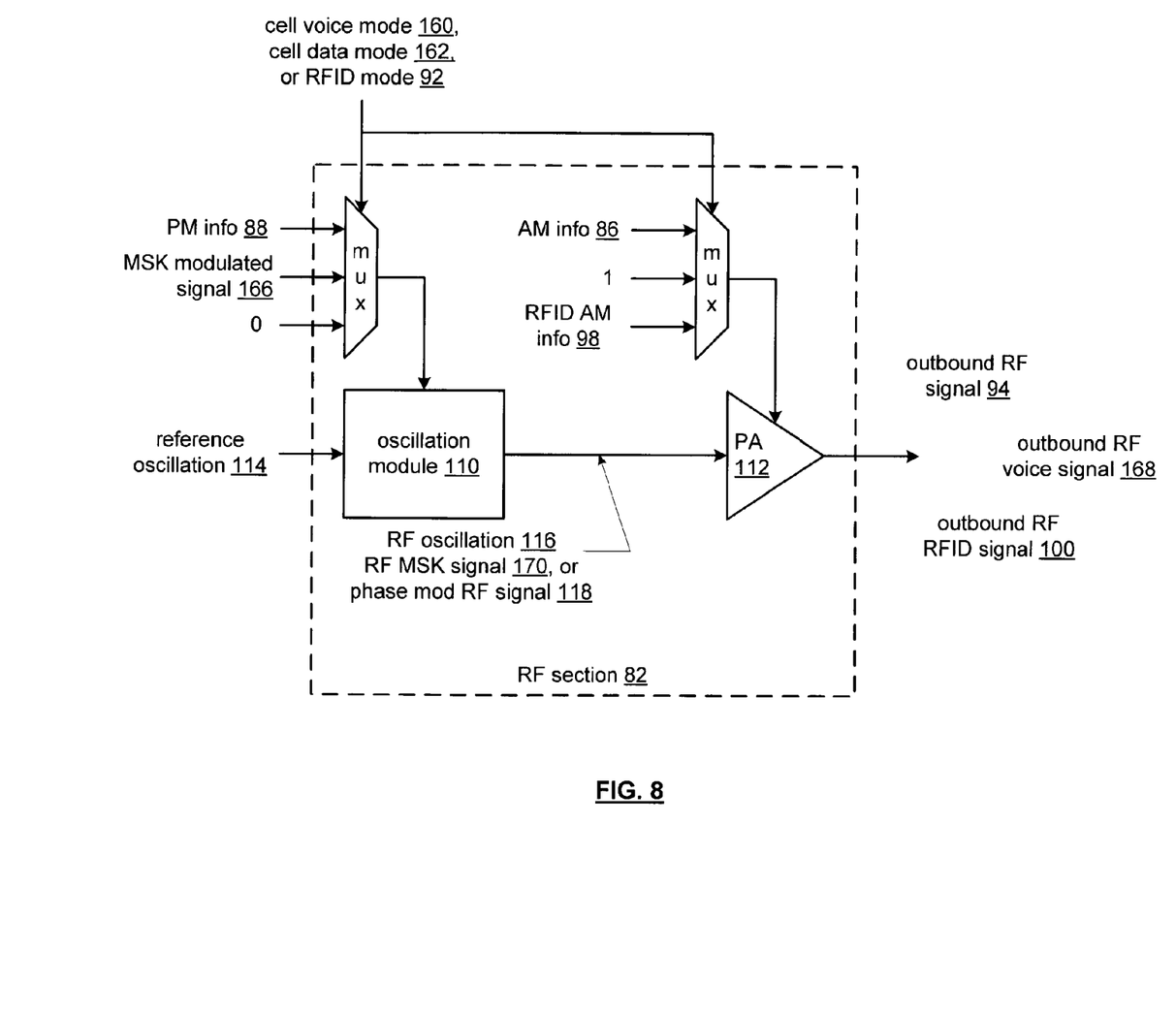
FIG. 8 is a schematic block diagram of another embodiment of an RF section in accordance with the present invention.

FIG. 8 is a schematic block diagram of another embodiment of the RF section 82 that includes an oscillation module 110 and a power amplifier module 112. The oscillation module 110, which may include a phase locked loop, a fractional-N synthesizer, a crystal oscillator, a frequency divider, and/or a frequency multiplier, converts a reference oscillation 114 into an RF oscillation 116. When the IC 52 and/or 62 is in the cellular data mode 162, the oscillation module modulates the RF oscillation 116 based on the phase modulation information 88 to produce a phase modulated RF signal 118.

The power amplifier module 112, which includes one or more power amplifier drivers and one or more power amplifiers coupled in series and/or in parallel, amplifies the phase modulated RF signal 116 in accordance with the amplitude modulation information 86 to produce the outbound RF data signal 94 when the IC is in the cellular data mode 162.

When the IC 52 and/or 62 is in the cellular voice mode 160, the oscillation module 110 modulates the RF oscillation 116 in accordance with the MSK modulated signal 166 to produce an RF MSK modulated signal 170. The power amplifier module 112 amplifies the RF MSK modulated signal 170 in accordance with a cellular voice gain setting (e.g., 1 or another constant value) to produce the outbound RF voice signal 168.

When the IC 52 and/or 62 is in the RFID mode 92, the power amplifier module 112 amplifies the RF oscillation 116 in accordance with the RFID amplitude modulation information 98 to produce the outbound RF RFID signal 100.

Figure 9:
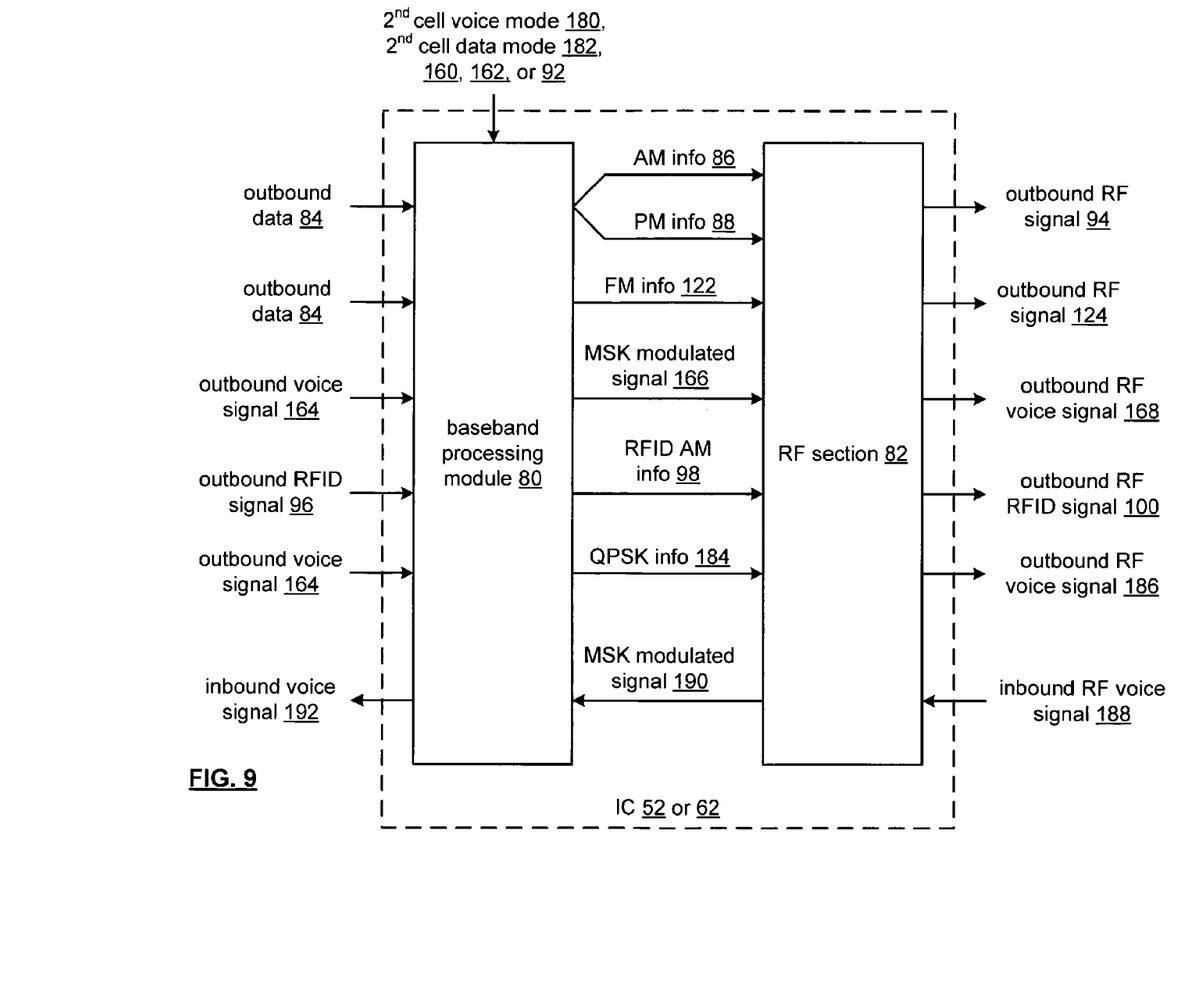
FIG. 9 is a schematic block diagram of another embodiment of an integrated circuit in accordance with the present invention.

FIG. 9 is a schematic block diagram of another embodiment of an integrated circuit 52 and/or 62 that includes the baseband processing module 80 and the RF section 82. In addition to performing the functions as described with reference to FIG. 8, the baseband processing module 80 may also convert the outbound data 84 into frequency modulation information 122 when the IC is in a second cellular data mode 182. When in this mode 182, the RF section 82 generates the outbound RF data signal 124 in accordance with the frequency modulation information 122.

In an embodiment, the baseband processing module 80 may further convert the outbound voice signal 164 into quadrature phase modulation information (e.g., QPSK) 184 when the IC is in a second cellular voice mode 180 (e.g., WCDMA). In this mode, the RF section 82 generates the outbound RF voice signal 186 in accordance with the quadrature phase modulation information 184.

In an embodiment, the RF section 82 generates an inbound MSK modulated signal 190 from an inbound RF voice signal 188 from the when the IC is in the cellular voice mode 160; generates inbound amplitude modulation information 130 and inbound phase 132 from an inbound RF data signal 126 when the IC is in the cellular data mode 160 (refer to FIG. 5); and generates inbound RFID amplitude information 136 from an inbound RF RFID signal 128 when the IC is in the RFID mode 92 (refer to FIG. 5).

In this embodiment, the baseband processing module 80 converts the inbound MSK modulated signal 190 into an inbound voice signal 192 when the IC is in the cellular data mode 160; converts the inbound amplitude modulation information 130 and the inbound phase modulation information 132 into inbound data 134 when the IC is in the cellular data mode 162 (refer to FIG. 5); and converts the inbound RFID amplitude modulation information 136 into an inbound RFID signal 138 when the IC is in the RFID mode 92.

Figure 10:
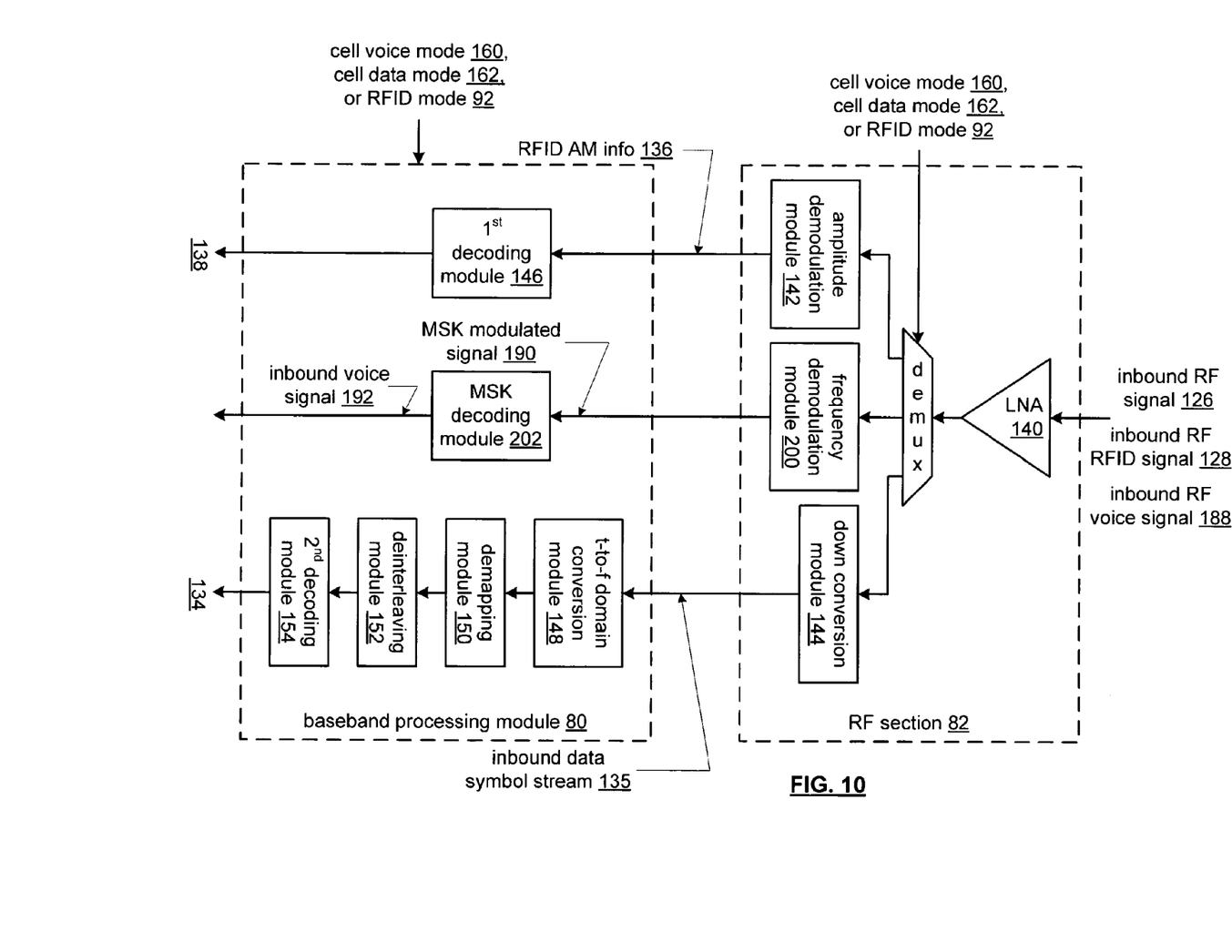
FIG. 10 is a schematic block diagram of another embodiment of an integrated circuit in accordance with the present invention.

FIG. 10 is a schematic block diagram of another embodiment of an integrated circuit 52 and/or 62 that includes the baseband processing module 80 and the RF section 82. The RF section 82 includes the low noise amplifier module 140, the amplitude demodulation module 142, a frequency demodulation module 200, and the down conversion module 144. The baseband processing module 80 includes the first decoding module 146, the time-to-frequency domain conversion module 148, the demapping module 150, the deinterleaving module 152, the second decoding module 154, and an MSK decoding module 202. When the IC 52 and/or 62 is in the RFID mode 92 or the cellular data mode 162, the baseband processing module 80 and the RF section 82 functions as previously discussed with reference to FIG. 6.

When the IC 52 and/or 62 is in the cellular voice mode 160, the low noise amplifier module 140 amplifies the inbound RF voice signal 188 to produce an amplified inbound RF voice signal. The frequency demodulation module 200 demodulates the amplified inbound RF voice signal to produce the inbound MSK modulated signal 190. The MSK decoding module 202 decodes the inbound MSK modulated signal 202 to produce the inbound voice signal 192.

Figure 11:
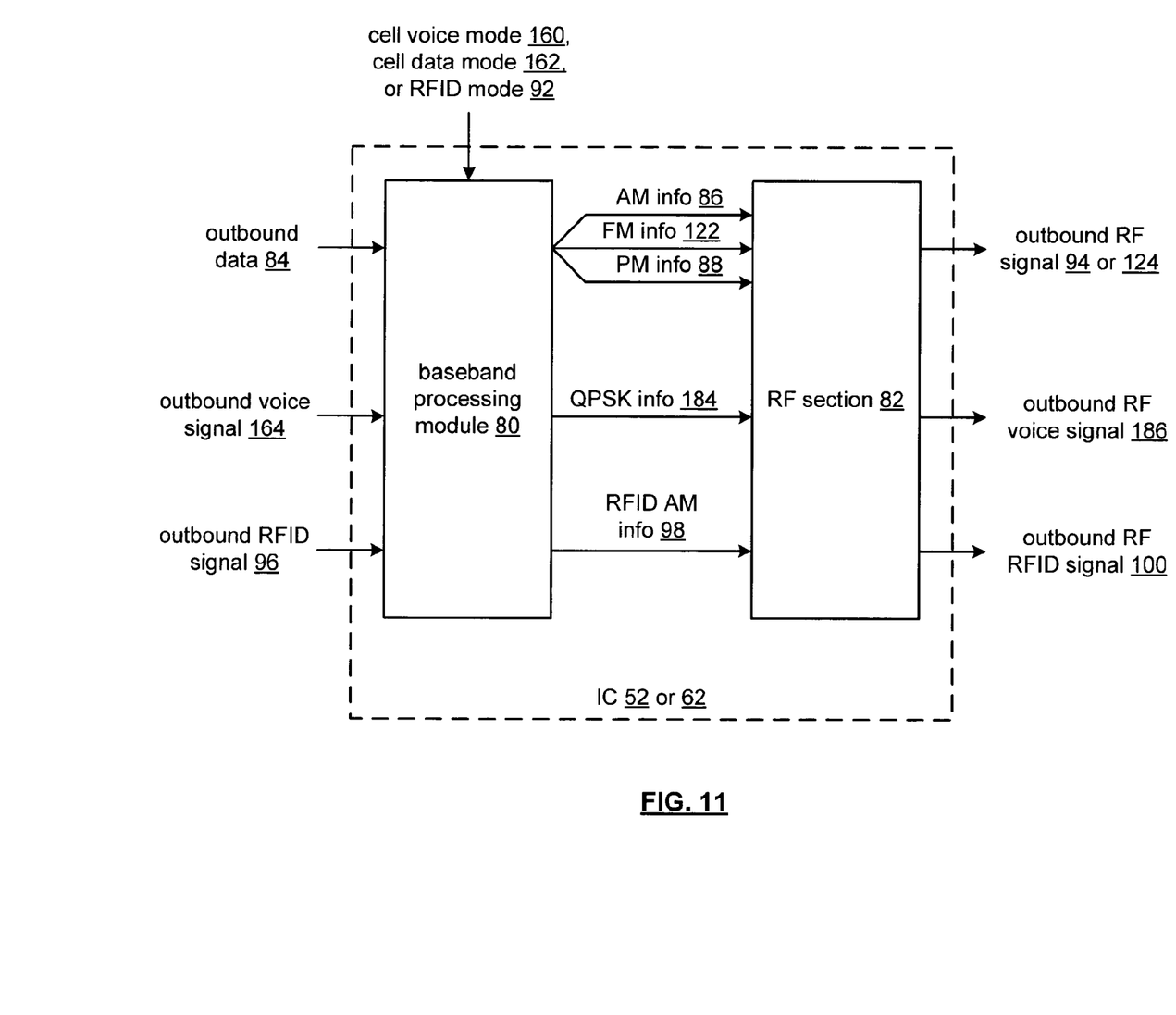
FIG. 11 is a schematic block diagram of another embodiment of an integrated circuit in accordance with the present invention.

FIG. 11 is a schematic block diagram of another embodiment of an integrated circuit 52 and/or 62 that includes the baseband processing module 80 and the RF section 82. In an alternate embodiment, the IC 52 and/or 62 may further include an on-chip digital-to-RF interface coupling the baseband processing module 80 to the RF section 82.

In an embodiment, the baseband processing module 80 converts the outbound voice signal 164 into quadrature phase modulation (e.g., QPSK) information 184 when the IC is in a cellular voice mode 160 (e.g., WCDMA). The RF section 82 generates an outbound RF voice signal 186 in accordance with the quadrature phase modulation information 184.

When the IC 52 and/or 62 is in the cellular data mode 162, the baseband processing module converts the outbound data 84 into at least one of amplitude modulation information 86, phase modulation information 88, and frequency modulation information 122. For example, if the cellular data mode 162 is for EDGE, then the baseband processing module 80 would produce the amplitude and phase modulation information 86 and 88. As another example, if the cellular data mode 162 is GPRS, then the baseband processing module 80 would produce the frequency modulation information 122. In this mode, the RF section 82 generates the outbound RF data signal 94 or 124 in accordance with the at least one of the amplitude modulation information 86, the phase modulation information 88, and the frequency modulation information 122.

When the IC 52 and/or 62 is in an RFID mode 92, the baseband processing module 80 converts the outbound RFID signal 96 into RFID amplitude modulation information 98. The RF section 82 generates the outbound RF RFID signal 100 in accordance with the RFID amplitude information 98.

In any of the above described embodiments, the baseband processing module 80 may convert the outbound data 84, the outbound voice signal 164, and/or the outbound RFID signal 96 into polar coordinates (e.g., phase [e.g., $\phi(t)$] and/or amplitude information [e.g., $A(t)$]) and/or into Cartesian coordinates [e.g., in-phase (I) and quadrature (Q) components, where $I(t)=A_I(t)\cos(\omega_0(t)+\phi(t))$ and $Q(t)=A_Q(t)\sin(\omega_0(t)+\phi(t))$]. Similarly, the RF section 82 may convert in the inbound RF signal 126, the inbound RF RFID signal 128, and/or the inbound RF voice signal 188 into polar coordinates and/or Cartesian coordinates.

In addition, the RF section 82 may include a wide bandwidth transmitter section to concurrently transmit the outbound RF RFID signal 100 and the outbound RF signal 94 or the outbound RF voice signal 168. Further, the RF section 82 may include a wide bandwidth receiver section to currently receive the inbound RF RFID signal 128 and the inbound RF signal 126 or the inbound RF voice signal 188. In this instance, the RFID inbound and outbound RF signals are in one frequency band (e.g., 900 MHz) and the voice and/or data inbound and outbound RF signals are in another frequency band (e.g., 1.8 GHz).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An apparatus comprising:
a cellular transceiver to provide cellular communication when in a cellular mode of operation; and
a radio frequency identification (RFID) circuitry to provide RFID communication separate from the cellular communication when in a RFID mode of operation, wherein the cellular transceiver and the RFID circuitry are integrated on a same integrated circuit and in which the cellular transceiver and the RFID circuitry utilize common circuitry that includes a baseband processing module and a radio frequency section.

2. The apparatus of claim 1, wherein the RFID circuitry is a RFID tag.

3. The apparatus of claim 1, wherein the RFID circuitry is a RFID reader.

4. An apparatus comprising:
a baseband processing module to convert outbound data into a first format that is compatible for cellular transmission when in a cellular mode of operation and to convert an outbound radio frequency identification (RFID) signal into a second format that is compatible for RFID transmission when in a RFID mode of operation; and
a radio frequency section coupled to the baseband processing module to receive the converted outbound data and the converted outbound RFID signal, generate an outbound radio frequency data signal from the converted outbound data when in cellular mode of operation, and to generate an outbound radio frequency RFID signal from the converted outbound RFID signal when in the RFID mode of operation, wherein the baseband processing module and the radio frequency section are integrated on a same integrated circuit.

5. The apparatus of claim 4, wherein the first format is a combination of amplitude modulation and phase modulation, and the second format is amplitude modulation.

6. The apparatus of claim 4, wherein the radio frequency section includes an oscillation module to provide local oscillations for frequency conversion in both RFID and cellular modes of operation.

7. The apparatus of 6, wherein the radio frequency section further includes a power amplifier module coupled to amplify and produce the outbound radio frequency RFID signal when in the RFID mode of operation and to amplify and produce the outbound radio frequency data signal when in the cellular mode of operation.

8. The apparatus of claim 7, wherein the radio frequency section also receives an inbound radio frequency RFID signal when in the RFID mode of operation and an inbound radio frequency data signal when in the cellular mode of operation, and respectively generate inbound RFID signal and inbound data signal for conversion by the baseband processing module.

9. The apparatus of claim 8, wherein the radio frequency section further includes a low noise amplifier module to amplify the inbound radio frequency RFID signal and the inbound radio frequency data signal.

10. The apparatus of claim 4, wherein both the first format and second format utilize frequency modulation.

11. A method comprising:
converting at baseband an outbound data into a first format that is compatible for cellular transmission when in a cellular mode of operation;
converting at baseband an outbound radio frequency identification (RFID) signal into a second format that is compatible for RFID transmission when in a RFID mode of operation;
generating at a radio frequency an outbound radio frequency data signal from the converted outbound data when in cellular mode of operation; and
generating at a radio frequency an outbound radio frequency RFID signal from the converted outbound RFID signal when in the RFID mode of operation, wherein the converting at baseband and generating at the radio frequency are performed by circuitry integrated on a same integrated circuit.

12. The method of claim 11, wherein the first format is a combination of amplitude modulation and phase modulation, and the second format is amplitude modulation.

13. The method of claim 11, further comprising generating local oscillations for both RFID and cellular modes of operation from a common circuitry.

14. The method of 13, further comprising amplifying and generating the outbound radio frequency RFID signal when in the RFID mode of operation and the outbound radio frequency data signal when in the cellular mode of operation from the common circuit.

15. The method of claim 14, further comprising receiving an inbound radio frequency RFID signal when in the RFID mode of operation and an inbound radio frequency data signal when in the cellular mode of operation, and respectively generating inbound RFID signal and inbound data signal for conversion at baseband.

16. The method of claim 15, further comprising amplifying the inbound radio frequency RFID signal and the inbound radio frequency data signal.

17. The method of claim 11, wherein both the first format and second format utilize frequency modulation.

* * * * *

UNITED STATES PATENT AND TRADEMARK OFFICE
CERTIFICATE OF CORRECTION

PATENT NO.       : 8,010,153 B2
APPLICATION NO.  : 12/895806
DATED            : August 30, 2011
INVENTOR(S)      : Ahmadreza Rofougaran It is certified that error appears in the above-identified patent and that said Letters Patent is hereby corrected as shown below:

Col. 12, line 1, in claim 7: after "The apparatus of" insert --claim--
Col. 12, line 42, in claim 14: after "The method of" insert --claim--

Signed and Sealed this
Eighth Day of January, 2013

David J. Kappos
*Director of the United States Patent and Trademark Office*